Patented Feb. 27, 1940

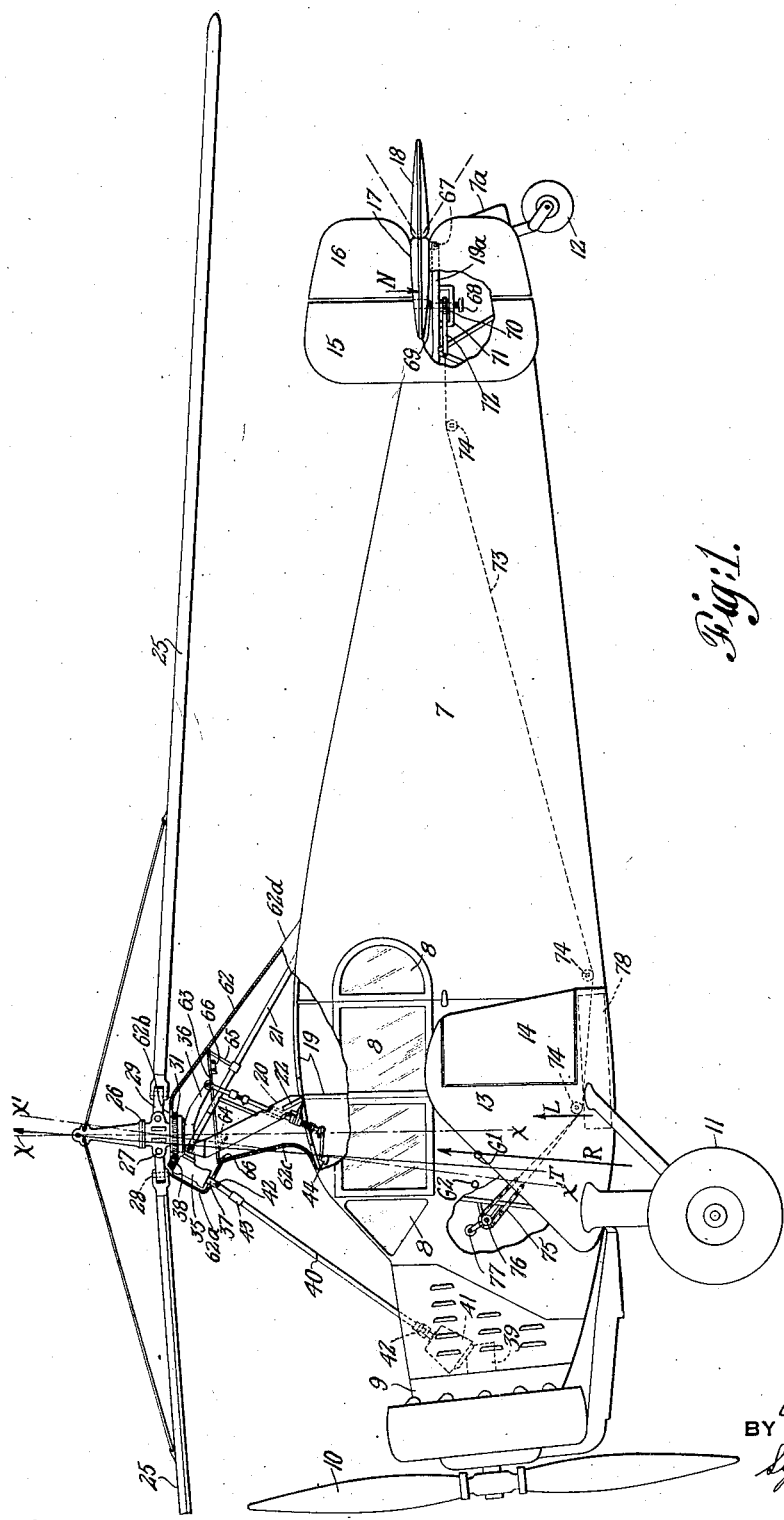

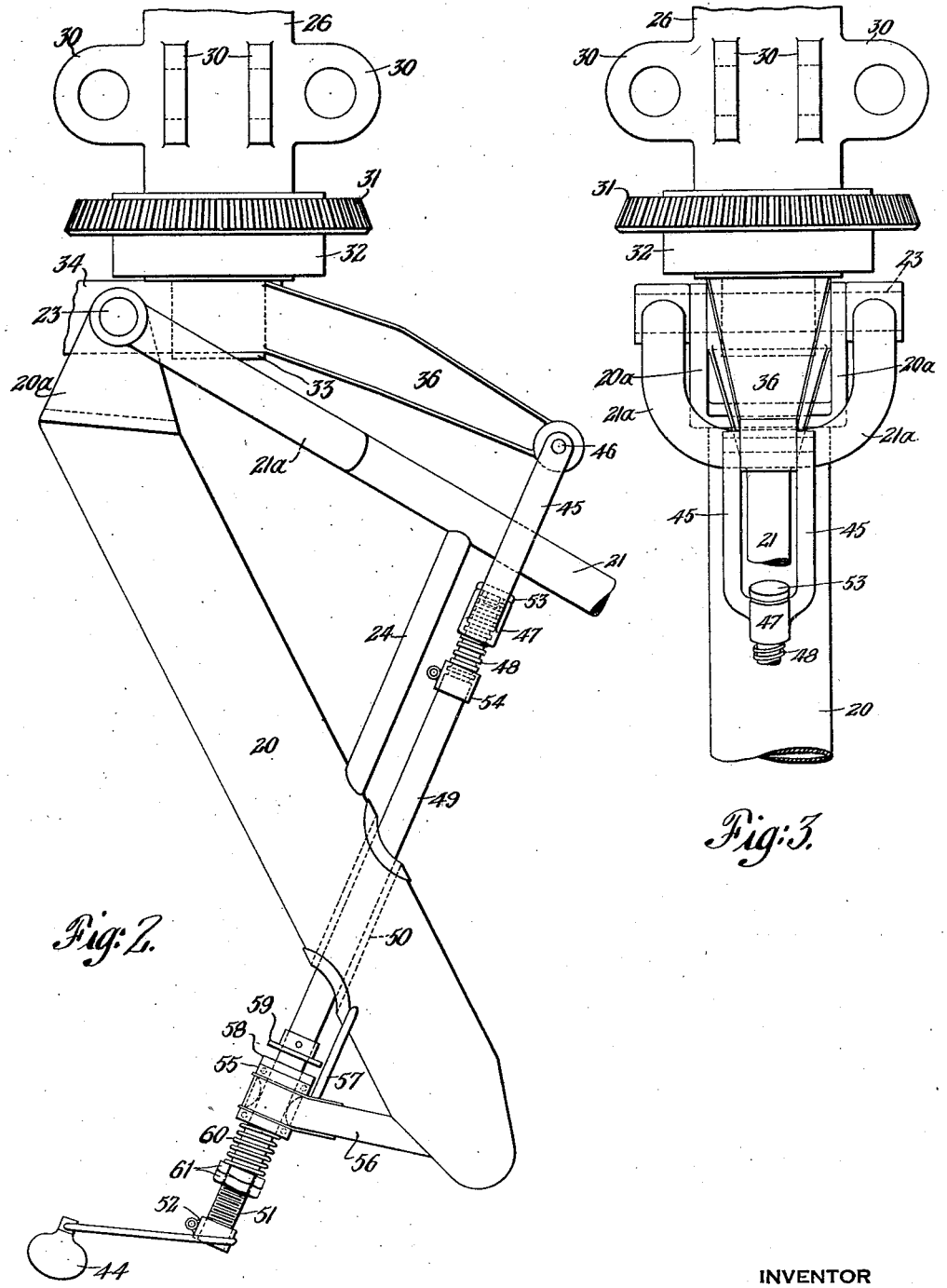

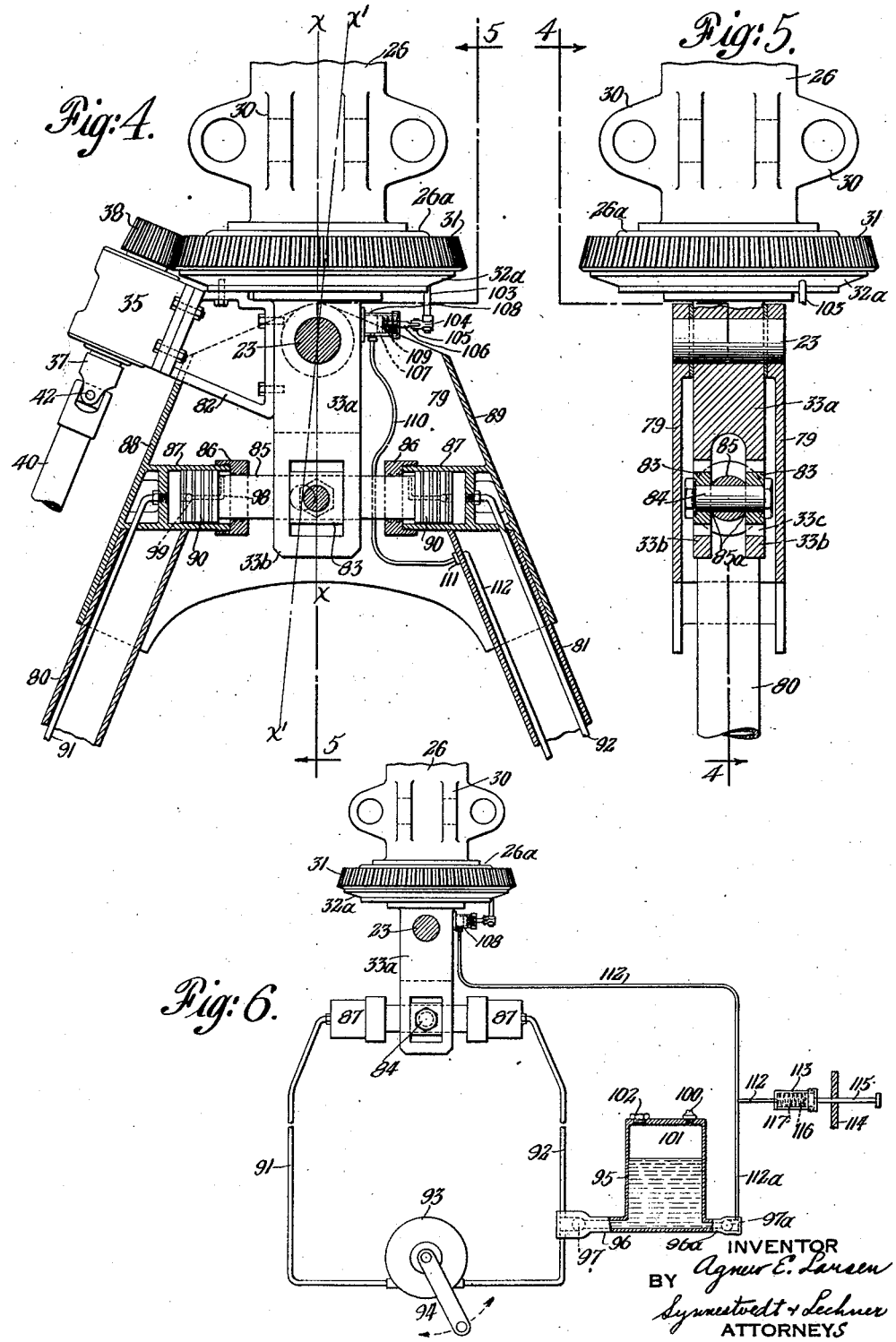

2,192,139

UNITED STATES PATENT OFFICE 2,192,139

ROTARY-WINGED AIRCRAFT AND THE OPERATION THEREOF

Agnew E. Larsen, Jenkintown, Pa., assignor, by mesne assignments, to Autogiro Company of America, a corporation of Delaware Application September 13, 1934, Serial No. 743,877
Renewed July 18, 1939

17 Claims. (Cl. 244—18)

This invention relates to rotary-winged aircraft and the operation thereof and, while in certain aspects it is of broad application in that field, the invention is particularly advantageous as applied to aircraft having autorotative wings, that is, machines in which the rotary sustaining wings are normally aerodynamically actuated by the relative air-flow in flight. Still further, the invention is especially adapted to air-craft characterized by a plurality of elongated wings, of aeroform cross-section, arranged to operate at autorotational incidence about a generaly upright axis, to which axis such wings are pivoted or otherwise flexibly secured at their roots, preferably by means of a pair of pivots for each wing, one pivot being approximately in a horizontal plane to provide for flapping of each wing up and down in a plane generally containing the rotor axis, and the other pivot having its axis lying substantially in a vertical plane to permit at least some fore and aft movement of the wing in its general path of rotation.

Among the advantages of this general type of aircraft might be mentioned the inherent metacentric stability (owing to the fact that the rotor is itself stable and supports the aircraft from a point generally above the center of gravity of the latter); the ready maneuverability (due at least in part to the hinging of the rotary wings on their axis); the freedom from danger of spinning or sta'ling (resulting from the fact that the wings have a motion irrespective of the translational motion of the aircraft); the ability to descend substantially vertically without danger, with resultant substantial increase in the possibility of making safe landings in the event of power failure and even in the event of bad judgment on the part of the operator (which results are in large part due to inherent capability of the autorotative wing system to give a sufficient sustaining effect for this purpose, independent of the operation or failure of the propulsion engine); the improved take-off and steeper angle of climb (which are concomitants of the ability of such a rotor to produce an increasing lift at increasing angles of inclination of the rotor, considered as a whole, all the way up to angles of around 40 or 50 degrees to the direction of the relative air-flow).

Broadly, my invention contemplates increasing the usefulness, and employing to a greater extent than heretofore possible the inherent advantages of such a machine and of such a rotor; obtaining certain of the known advantages thereof under certain conditions where such advantages have not heretofore been utilizable; and combining therewith certain new advantages not heretofore known; and thus, in general, enlarging the utility, and the field for use, of such aircraft. The invention also contemplates improvement of the aerodynamic efficiency.

More particularly, the invention contemplates improving the balance, stability and control of such aircraft, even where the machine has a substantial travel of the center of gravity thereof, as results, for example, from changes in the weight and disposition of the disposable loads; and specifically the invention involves a relationship between the thrust or lift line of the sustaining rotor and that of the fixed sustaining surfaces of the craft, a relationship between such lines of lift and the center of gravity of the craft, and an adjustability of the location of the rotor thrust line and preferably also of the lift line or characteristics of at least one of the non-rotative surfaces on the aircraft, such that the allowable variation in location of the center of gravity may be greater than heretofore, while still obtaining improved balance, stability and control under all conditions. Thus the invention also allows greater leeway in the design of the aircraft as a whole, since less emphasis need be placed upon minimizing the center of gravity movement; this being a very important advantage in the larger types of craft such as cabin transport machines.

Still further, the invention involves not only adjustability of the thrust line of the rotary wing system (in the longitudinal plane) to various fixed positions, but also the adjustability and/or biasing of at least one of the normally non-rotative fins, or control surfaces of the aircraft in such manner that under all conditions of adjustment of the rotary wing system and for all loading conditions and thus varying locations of the center of gravity of the craft as a whole, the proper longitudinal stability, and allied characteristics, may be obtained so as to obtain in this type of craft results similar to those flowing from what is termed a "longitudinal dihedral" in an ordinary fixed wing aeroplane.

Still more specifically, the invention contemplates a location of the rotor axis slightly behind the normal range of location of the center of gravity of the machine, and a tiltability of said axis, and thus of the rotary wing system as a whole in a fore and aft direction, whereby the lift line of a rotary wing system of the character specified, which moves forwardly of its axis of rotation during high speed forward flight, may be adjusted to the correct location relative to the center of gravity of the craft as a whole, under all conditions, for best longitudinal stability. By the same mechanism the invention provides for accurate adjustment of the rotor lift line so as to give the best conditions of balance for vertical descent and steep slow-speed landings, thereby greatly increasing the safety of operation and minimizing the possibility of damage to the machine. Similarly, since balance and stabilizing requirements are in large part taken care of by the rotor, the ordinary control surfaces, such as elevators, are free for utilization in their most effective range of motion, for their normal control purposes, whereby improved control under all conditions is obtained.

Likewise the invention contemplates, by such mechanism, the substantial improvement of the take-off of the machine, by tilting of the rotor to a higher general incidence; a similar adjustment of the rotor being utilizable just prior to landing. Furthermore, should the rotor revolutions tend to slow down for any reason, such as formation of ice on the rotary wings or blades, the incidence of the rotor as a whole can be increased, which tends to increase the R. P. M. of the rotor.

By similar operation of the mechanism, but in the opposite direction, that is by forward tilt of the rotor axis (decreasing the general incidence of the rotor), the invention contemplates a prevention of overspeeding of the rotor by wind gusts on the ground and the avoidance of undesired lifting of the machine from the ground under windy weather conditions. In addition, the invention contemplates the capability of taxiing the machine, even against the wind, with the tail wheel in contact with the ground, without undue risk of the machine taking off unintentionally, even when the rotor is turning at normal flight speed of rotation; this being accomplished by tilting the rotor forwardly to its minimum angle.

The invention further involves the utilization of a yielding or resilient device in the mounting or adjustment mechanism for the rotor, whereby to relieve the machine of the effects of air bumps and the like and thus improve the riding qualities. Associated with this, the invention contemplates, in a preferred embodiment, the location of a rotor tilting adjustment pivot forwardly of the normal range of movement of the rotor lift line, and the connection of the adjustment mechanism to the rotor rearwardly of said pivot in such manner that said mechanism is normally held in tension, when the rotor is producing lift, whereby the adjustment mechanism may be made extremely light in weight.

Specifically, in combination with one or more of the features just described in association with the rotor, the invention contemplates a bias device on one of the control surfaces, or a similar device or adjusting mechanism for a stabilizing surface, whereby the machine can be properly balanced and stabilized for any condition of normal flight, without the need of the normal controls being constantly held by the pilot.

Other features of the invention include: arrangement of a drive or starting device coupled with the movably adjustable rotor and the arrangement of a rotor braking device of a fluid type (such as a hydraulic brake system), in such cooperative relation with the fixed and movable rotor mounting parts that the rotor driving and braking mechanism will operate properly under all conditions of adjustment of the rotor; a novel and advantageous arrangement of the rotor adjusting mechanism with respect to the rotor and the rotor mounting pylon; the simplification of the pylon itself, and the disposition thereof relative to the occupants' compartment such as to improve the visibility from said compartment; an improved, stream-line stabilizing fairing which serves also to enclose the rotor pylon and certain of the rotor adjustments, rotor driving and rotor braking parts; and in general an improvement in the efficiency of the machine as well as in its operation.

The invention further contemplates an alternative form of rotor adjustment, by a fluid (for example, hydraulic) system, having a novel cooperation with the rotor axis and rotor mounting pylon, whereby also a minimization of weight and an increase in the accuracy of the rotor adjusting mechanism is obtained; and a novel and advantageous association of a fluid rotor tilting system and a fluid rotor braking system. The foregoing, and other features of the invention which may be incident thereto or may occur to those skilled in the art, will be more fully understood after examination of the following description, taken together with the accompanying drawings, in which drawings:

Figure 1 is a side elevational view of an aircraft of the auto-rotative wing type, with certain parts broken away and others shown in section, illustrating in a preferred embodiment some of the major features of the present invention;

Figure 2 is a fragmentary side elevational view, on a substantially larger scale, of the major parts of the rotor adjusting mechanism of the machine shown in Figure 1;

Figure 3 is a fragmentary rear view of the mechanism of Figure 2;

Figure 4 is a longitudinal vertical section through a modified form of rotor mounting, adjusting, driving and braking mechanism, in accordance with this invention, with certain parts shown in elevation, the view being taken substantially on the line 4—4 of Figure 5;

Figure 5 is in part an elevation and in part a section, taken substantially on the line 5—5 of Figure 4; and Figure 6 is a schematic or diagrammatic view of the rotor adjusting and braking mechanism and part of the rotor driving mechanism, including a showing of the rotor adjustment and brake control handles (which latter are omitted in Figures 4 and 5).

Referring first to Figures 1 to 3 inclusive it will be seen that I have illustrated an aircraft 7 of the transport type having a plurality of windows 8 around the compartment for the pilot and occupants, an engine and propeller indicated at 9, 10, a pair of main or forward landing wheels, one of which is indicated at 11, a tail wheel 12, sharply dihedraled fixed wings 13 carrying ailerons 14, a pair of vertical fins one of which is indicated at 15, each carrying a rudder 16 (the rudders being divided into upper and lower sections) and a stabilizer 17 with attached controllable elevator 18.

The body, inside its covering, may include a rigid metal-tube fuselage structure 19, to which, at suitable points of rigidity, are secured a pair of rotor mounting pylon legs 20 and 21. For structural and aerodynamic reasons, such as adequate vision from the cabin and minimization of parasite resistance, etc., I arrange the two pylon legs in the position of an inverted V, which is inclined with its apex well forward of the points of support on the fuselage, and I form the leg 20 as a very large steel tube, which may be laterally braced, near the base, by means of diagonal tubing 22, and which has forks 20a at its upper end. The rear leg 21 lies at a still greater inclination, and is rigidly joined to the top of the forward leg, by means of a forked end 21a, preferably at the point of the pivot axis 23 for adjustment of the rotor. The pylon is still further stiffened by a single bracing tube 24 interconnecting the two main tubes 20 and 21.

The rotor, which assumes substantially the entire weight of the craft during vertical descent and around three-fourths or more of the load during forward flight (when the fixed wings 13 assume a fraction of the burden) comprises a plurality of elongated autorotatable wings 25, each of which is of aeroform cross section and is mounted on the rotor hub member 26 by means of the horizontal and vertical pivots 27 and 28, a link or extension block 29 being preferably inserted between the two pivots of a pair. While only two rotative blades or wings are shown in Figure 1, it will be seen from Figures 2 and 3 that the rotor hub 26 is arranged with pairs of apertured ears 30 for mounting four rotor blades, the number of these blades being immaterial to the present invention. The wings 25 are shown in their position of rest, but it will be understood that they normally assume a somewhat upwardly coned position when under flight load, and are subject to swinging motions on their pivots, under the influence of lift, centrifugal, acceleration, drag, and other forces.

The rotor hub 26, which carries a ring gear 31 for starting purposes, is mounted to be freely rotatable by means of the usual bearings (not shown), about the fixed axis structure 32, which has a lower extension 33 rigidly secured within the base or mounting member 34. The base 34 is tiltably mounted on the pivot 23, in between the bifurcations 20a of the main pylon leg; and this tiltable base member is extended forwardly to serve as a bracket for the rigid mounting of the clutch housing 35 (see Figure 1), and is extended rearwardly and downwardly in the form of an arm or lever 36 for connection with the rotor adjustment mechanism.

In the clutch housing 35 I preferably enclose an overrunning clutch as well as bearings for the shaft 37 which connects through said clutch to the driving pinion 38, adapted to mesh with the ring gear 31. For starting the rotor, prior to take-off, I may employ a gear unit 39 connected with the engine 9 and driving the shaft 40 through a manually operated clutch device indicated at 41; the shaft 40 having a pair of universal joints 42 and a slip-joint 43, which are here utilized not only to accommodate slight misadjustments of alignment but also to accommodate the adjustable tilting of the rotor about the tilting pivot axis 23. The internal mechanism within the gear housing 39 and clutch casings 41 and 35 need not here be shown, since they are now known in this art and are described and claimed in the copending application of Joseph S. Pecker, Serial No. 512,383, filed January 30, 1931, which issued April 30, 1935 as Patent No. 1,999,636. The rotor starter mechanism has however, a novel cooperation with the rotor, pylon, and other parts, as will hereinafter appear.

For adjusting the tilt of the rotor axis and thus the average angle of incidence of the rotor taken as a whole, I dispose a crank 44 within the cabin, adjacent the roof thereof, connecting the same, through certain operating mechanism, to the lever arm 36, as will now be described, with reference to Figures 2 and 3.

At the lower rear end of the rotor axis tilting lever 36 I connect the yoke or fork 45, by means of a pivot 46. The bifurcations of this fork are positioned to straddle the rear pylon leg 21 and are joined by an internally threaded lug 47. Within said lug is threaded the upper end 48 of the adjusting rod 49 which passes downwardly through a thimble 5 in the main pylon leg 20, the lower end 51 of the rotatable rod 49 carrying the operating crank 44 by means of the rigid clamp 52.

The extent of the normal range of rotor adjustment is determined by the stop member 53 fixed in the upper end of the rod 49 and the adjustable collar member 54 located on said rod at a point below the lug 47. Near its lower end the rod 49 is supported and positioned by means of a sleeve or bearing device 55 which is fixedly supported by the pylon leg 20 through the intermediation of the bracing members 56 and 57. The support or bearing 55 carries at its upper face any suitable cushioning washer, such as the rubber ring 58, and spaced slightly above the same is an abutment collar 59 which is fixed on the rod 49. Below the support 55, a spring 60 (of considerable strength) is interposed between said support 55 and the adjustable lock nuts 61.

The range of tilting adjustment of the rotor axis may be such that a plane perpendicular to the axis of the rotor may be given a motion from about one degree negative incidence (at the extreme forward position of tilt) to about three or more degrees positive incidence (at the extreme rearward position of tilt), such incidence of the rotor as a whole being considered with relation to the normal longitudinal axis of the machine when in cruising attitude. It will be seen from Figure 1 that, with the rotor tilted all the way forward, its axis lies substantially on the line X—X. In vertical descent, the thrust line of the rotor substantially coincides with the axis of rotation; but as the machine attains high speed forward flight, the thrust line shifts or tilts, for example, to the position T; and it will be observed that in moving anywhere within the range between the line X—X and the arrow T the thrust line lies behind the axis of the adjustment pivot 23. The rotor thus tends at all times to exert an upward lift on the arm 36, and keeps the lock nuts 61 up against the spring 60 which seats against the fixed bearing 55; and any turning of the adjustment rod 49 by means of the crank 44 results in an adjustment of the rotor axis, the rod 49 normally having no longitudinal motion. The spring 60 will, however, yield, under abnormal air bumps, and thus cushion the effect of such bumps upon the machine. Furthermore, the movement of the rotor, in momentarily compressing the spring, is such as to partially "unload" the rotor, that is, to shed a portion of the increased lifting force due to the air bump, and the action of the rotor is just the reverse of this when the rotor encounters an atmospheric or wind gust condition of a nature tending to decrease the rotor lift. Thus the rotor itself acts in the nature of a cushion (in addition to the cushioning action prov'ded by the spring 60 and the washer 58 with its clearance relative to the stop member 59), materially improving the riding qualities of the machine.

In Figure 2, the rotor tilting adjustment device is shown at its limit of motion for forward tilt. In that position, as well as in any other position of the adjustment mechanism, when the machine is on the ground and the rotor is brought to rest, the dead weight of the rotor, acting to the rear of the pivot axis 23, will bear downward upon the adjustment mechanism, and the rotor 49 will move downwardly until the stop member 59 abuts the supporting cushion 58.

It will now be seen that the general arrangements of the rotor mounting and adjusting mechanism, as well as the rotor drive, and their relationship to fuselage and cabin, are such that most of these parts can be readily faired or commonly enclosed, as by means of the light-weight removable metallic shell 62, which projects forwardly, above the top of the cabin, having the general appearance of a horn, there being a small forward extension 62a of this shell, to enclose the overrunning clutch unit of the rotor starter. A suitable gap or aperture 62b is provided in the top of the shell or horn, giving enough clearance to accommodate the entire range of rotor tilting adjustment, and a similar clearance is provided around the starter shaft, but it will be observed that by locating the planes of such apertures close to the plane of the tilting pivot, the clearances can be made relatively small, thus preserving the efficiency and the neat and striking appearance of the fairing shell.

The shell may be made in parts, such as right and left halves, and is supported not only at its base but also by means of a light metal tube frame 63, which is secured by small braces 64, 65, to the pylon legs 20 and 21, and by small tabs or clips 66 to the shell itself. The shell 62 is of aeroform cross section, being rounded at the nose 62c, and coming to a point 62d at the trailing edge, the major and minor axes of this aeroform casing both diminishing toward the upper end thereof. The shell 62 is thus of a substantially true streamline shape, viewed in section, and is faired into the top of the cabin, in such manner that parasite drag losses of the rotor supporting, controlling and driving mechanism are reduced to a minimum, while at the same time said shell serves as an addititonal vertical fin area, located well above the center of gravity of the craft, indicated at $G^1$, which gives a lateral stabilizing effect. The airflow over the cabin and around the stream-lined pylon is such that the most effective directional control is obtained by placing one rudder 16 at each side of the narrow tail end 7a of the fuselage.

Turning now to the stabilizer mechanism, it will be observed that a normally fixed stabilizer 17 has its rear spar pivotally mounted at 67 upon a part 19a of the fuselage framing. A vertically movable, non-rotative, screw or worm 68 is pivotally connected at 69 to the forward spar of the stabilizer. A rotatable sprocket 70, fixed against axial movement by means of the member 19a and the bracket 71, is thread-mounted on the screw 68, and is actuable by the sprocket chain 72, the two ends of the latter being connected by cable 73 (which passes over pulleys 74) to the ends of a section of chain 75 in the pilot's space of the machine, where the pilot can adjust the stabilizer by means of the sprocket 76, actuated by the crank 77. Alternatively or in conjunction with such stabilizer adjustment, I may employ an adjustable bias or elastic bungee operating, for example, upon the elevator 18, for stabilizing purposes. The balancing, stabilizing, and controlling operations will now be described:

The line X—X indicates the position of the rotor axis when the rotor is tilted fowardly, as in Figure 1, and the line X'—X' indicates approximately the position of rearward tilt. These lines also represent the range of adjustment of the rotor thrust line, during substantially vertical descent, since in the absence of a forward motion of the craft relative to the air the thrust line substantially coincides with the axis of rotation. $G^1$ and $G^2$ indicate the extreme positions of the center of gravity, said center lying at $G^1$ when the machine is heavily loaded, and at $G^2$ when there are no passengers in the rear of the cabin and when the main gasoline tank (indicated at 78) is nearly empty.

Since, during vertical descent, the non-rotative surfaces 13, 14, 17 and 18, give an almost negligible lift, adequate stability and control depend to a large extent upon a good condition of longitudinal balance. Under these conditions, it will be seen that the rotor axis X—X should be tilted to a position substantially intersecting, or preferably slightly behind the center of gravity, so that the thrust line of the rotor (then coinciding with the axis) produces a tendency of the machine to nose downward just slightly, so as to preserve a slight forward speed of the machine, during substantially vertical descent, whereby some effective air-flow over the ailerons is present. It will be seen that the range of tilting adjustment from the line X—X to the line X'—X' is sufficient to obtain this desired relationship, whatever may be the location of the center of gravity between the two limiting positions $G^1$ and $G^2$.

During forward flight, since the fixed wings are producing perhaps a quarter of the total lift and the thrust line of the rotor has moved in advance of its rotational axis, the conditions are quite different. In forward flight (at least when the loading is such that the center of gravity is near the point $G^1$) the rotor axis is adjusted to its position of lowest incidence, that is, to the position X—X. Under such conditions, the thrust of the rotor is indicated by the arrow T and the lift of the fixed wing by the arrow L; the resultant total lift being indicated by the arrow R, which is just slightly behind the center of gravity. The stabilizer 17 is then adjusted by the crank 77 to give a slight negative lift, indicated by the arrow N, producing the effect of a positive longitudinal dihedral, which gives a high degree of stability. Even under conditions of very light loading (when the center of gravity might be near the position $G^2$) the rotor could still be left with its axis on the line X—X, for forward flight, and adequate longitudinal stability maintained, by increasing the negative setting of the stabilizer 17; but for maximum flight efficiency, it may be desirable, under such conditions, to adjust the rotor axis to some intermediate position between the line X—X and the line X'—X', so as not to have to employ too great a negative setting of the stabilizer (or too great a negative bias on the elevator, if such device be employed). However, for most conditions of loading, throughout most of the range of forward flight speed, it is found to be satisfactory to keep the rotor adjusted to the position X—X.

From the foregoing general discussion of operations during substantially vertical descent and during forward flight, it will also be quite clear how the adjustment of the rotor tilting can be utilized for preventing excessive slowing down of the rotor, as might result, for example, from icing. Under such conditions, the rotor is tilted to the position X'—X', and the stabilizer is adjusted, if necessary, even to a positive angle, and some forward speed is maintained, until a suitable landing can be effected. Likewise it will now be clear that the tilting of the rotor to the position X—X can be utilized to prevent damage to the rotor or undesired take-off (when taxying along the ground into a wind, with the rotor turning); and for the latter purpose, the range of forward tilt may, if desired, be made such as to pass substantially beyond the line X—X, especially if the particular machine be built with an undercarriage providing a high ground angle. The rapidity and angle of take-off may obviously be increased by tilting the rotor backwardly, i. e., shifting its axis to the position X'—X'.

Turning now to the modification shown in Figures 4 to 6 inclusive, it will be seen that the same general type of rotor head and rotor starter is shown, but that other parts of the mechanism are of a different character, as follows: The non-rotative mount or base 32a has its downward extension 33a pivoted by means of the pivot pin 23 intermediate the side plates 79 of a pylon apex structure which is mounted by means of the tubular legs 80, 81. A filler block or bracket 82 is interposed between the clutch casing 35 and the rotor axis member 33a.

The bifurcations 33b, forming the lower end of the axis member 33a, are apertured at 33c for vertically sliding engagement by a pair of plates 83 which are mounted by a pivot 84 on a double-acting piston rod 85, which latter has flattened faces 85a, in an intermediate zone, for engaging the flat inside faces of the bifurcated ends 33b of the axis member and also the inside faces of the guide plates 83. Adjustment of the rotor axis between the positions X—X and X'—X' is obtained by horizontal reciprocation of the rod 85, in a direction longitudinally of the aircraft.

The piston rod 85 passes through packing heads 86 of the cylinders 87 which are respectively secured to the front and rear walls 88 and 89 of the pylon apex 79; and the rod mounts two pistons 90, one in each cylinder. The fluid, preferably oil, for moving the pistons, is delivered through forward and rearward tubes (for example, flexible metallic pipes) 91 and 92, which connect at opposite sides of a reversible pump device 93 having an operating crank or handle 94.

By turning the crank 94 in the direction of one of the arrows (Fig. 6) fluid is taken from pipe 92 and delivered through pipe 91; and by turning the crank in the opposite direction, the reverse flow takes place. Loss or leakage of fluid is made up from the tank or reservoir 95, through the connection 96, having a ball check valve 97 which seats in a direction to prevent the pump from forcing the liquid back into the tank. Passages 98 with check valves 99 are provided in the pistons 90, so that any leakage of liquid around the pistons to the non-pressure side thereof, may be automatically relieved. The supply reservoir 95 may be located above the highest point of the fluid piping system, for gravity feed, or else, as here shown, a slight pressure, as by forcing compressed air through the valve 100, may be maintained in the tank space 101, the tank being also provided with an oil filling aperture normally closed by a tight plug 102.

In this form of mechanism I have also illustrated a hydraulic rotor brake, peculiarly adapted to cooperation not only with the tiltably mounted rotor but also with the rotor tilting mechanism itself. The flange 26a of the rotor hub normally carries a peripheral brake drum, with the ring gear 31 mounted on the outside of the drum; and the mechanical operating parts of the brake (not shown) are normally housed within said drum, the open bottom of which is closed by the fixed base member 32a. Through said member I provide a downward extension 103 of the brake operating torque rod. On the lower end of the rod, there is rigidly fixed an arm or lever 104 which is pivoted at 105 to the rod 106 of piston 107 and which operates in cylinder 108, mounted fast on the tiltable rotor axis member 33a. A powerful brake releasing spring 109 is mounted in the cylinder 108.

A flexible hose or tube 110 extends from the inner end of the cylinder 108 down to the union 111, where it connects to a small pipe or tube 112, which runs down through the pylon leg 81 and opens into the primary cylinder 113. This cylinder is mounted in any convenient position behind the dashboard 114 of the pilot's compartment, and a suitable brake operating member or plunger 115 extends through said dashboard, for manual operation of the piston 116 in said cylinder. A light return spring 117 is housed within the cylinder 113. A branch pipe or passage 112a connects the hydraulic brake system to any suitable source of supply or reservoir; and, in accordance with the present invention, I utilize for this purpose the same tank 95 which serves to supply the rotor tilting system. Thus, the pipe 112a is connected to the tank take-off 96a having a ball check valve 97a. If a pressure-tank oil feed arrangement be used, it is important that the spring 109 be made to have greater effect than the air pressure in the chamber 101. Otherwise, when the rotor brake is intended to be in its release position, the air in chamber 101 would force the oil through pipe 112a and pipe 112 into the secondary cylinder 108, and move the piston 107 to apply the brake.

The hydraulic braking system for the rotor, with flexible fluid connection between the fixed part of the rotor mount and the tiltable part, is highly advantageous, not only because of the fact that it ensures proper operation of the braking and tilting mechanism, independently of each other, but also because it transmits the braking action to the movable rotor with a minimum of weight, a minimum of mechanism, and a minimum of lost motion. Some of these advantages are also characteristic of the hydraulic tilting mechanism itself; and it will be seen that with a fluid rotor tilting system, a flexible fluid rotor braking system, and a yielding rotor starter connection (in the form of universal and slip joints) the rotor tilting adjustment can be made to operate very easily, and extremely accurately; and at the same time the normally free autorotative actuation of the rotor is also assured, at all times, since both the rotor starter and the rotor brake have their disengaging parts located very close to the rotor hub itself.

Although, in order to avoid complication of the drawings, the hydraulic brake system has been omitted in illustrating the embodiment shown in Figures 1 to 3, it will be understood that such may be applied thereto and has in practice been so applied and found to produce the novel advantages abovementioned.

I claim:

1. In an aircraft with means of forward propulsion and a body having means for receiving disposable loads over an area offset longitudinally from the normal location of the center of gravity of the craft whereby the actual center of gravity travels through a certain fore and aft range according to the loading conditions, control surfacing for the craft comprising a surface movable over a predetermined range at each side of mid-position for controlling the craft in the pitching plane, a rotary wing system capable of autorotational actuation by the relative air-flow in flight and having pivotally-mounted wings whereby the thrust line of the system moves forwardly with increase in flight speed, the wing mounting means including a rotor head or axis member and means to support the same above the body of the craft, fixed wing surfaces extending laterally of the craft in position to produce during forward flight operation a useful lift passing rearwardly of the normal range of movement of the center of gravity of the craft, the said mounting means locating the rotary wing system with its axis line normally extending approximately upright with respect to the longitudinal axis of the craft and in a position so related to the rearmost limit of the normal range of movement of the center of gravity of the craft that in forward flight, even when the rotor thrust moves forward of the craft's center of gravity, the resultant of the rotor thrust and the fixed wing lift lies slightly behind said limit, and means for adjustably shifting the axis of said system in a direction fore and aft of the craft through a range extending forwardly from the said normal location to a location where the axis line lies close to the forward limit of the normal range of travel of the center of gravity of the craft, including mechanism for substantially fixing said axis in various positions of adjustment whereby to balance the craft for vertical descent on a substantially even keel and whereby in conjunction with the lift of the fixed wings to stabilize the craft in forward flight, so that under all normal flight and loading conditions the normal range of movement of said control surface is available for control purposes.

2. For an aircraft having a normally air-rotated sustaining wing system or rotor, a rotor mounting and adjusting apparatus comprising a fixed mounting structure, a movable rotor hub supporting member, a pivot device mounting said member on said structure for tilting of the rotor in a fore and aft direction, mechanism connected with said member and adjustable to various fixed positions for adjustably tilting the latter to various corresponding positions about said pivot device, cushioning means yieldingly providing for slight motion of said member in the direction of forward tilt of the rotor, beyond the point determined by any particular setting of said mechanism, and a second cushioning means having a lost motion relationship to an element of said mechanism, said second cushioning means being so disposed that said element takes up the lost motion and thereafter abuts said cushioning means, whereby to provide first a free and then a cushioned movement of said member and thus of the rotor in the opposite direction, beyond the point determined by any particular setting of said mechanism.

3. In an aircraft, a body having an occupants' compartment, a rotary sustaining wing system spaced thereabove, a mount for said system extending generally from the rear portion of said compartment upwardly and forwardly, and a shell, streamlined in cross section, substantially enclosing said mount and extending similarly upwardly and forwardly after the manner of a projecting horn, together with a rotor starter drive shaft extending from the body upwardly and rearwardly and through said shell for connection with the hub of the rotor.

4. In an aircraft, a body having an occupants' compartment, a rotary sustaining wing system spaced thereabove, a mount or pylon for said system extending in substantially cantilever fashion generally from the rear portion of said compartment at an upward and forward inclination, said rotor having a hub mounted adjacent the foremost part of said pylon, and a starter shaft for said rotor positioned forward of said compartment and extending from the body at an upward and rearward inclination to a point of connection with the hub adjacent the top of said pylon.

5. For aircraft of the rotary wing type, a stabilizing system comprising a shiftably-mounted rotor axis, means for adjustalby setting the same so as to locate the lift-line of the rotary wings in various positions longitudinally of the craft in accordance with variations in C. G. location, a movably-mounted tail surface or the equivalent, and means for adjustably setting the same in conformity with adjustments of said axis to produce the effect of a positive longitudinal dihedral whereby to maintain a stable relationship as to longitudinal attitude of the craft.

6. In an aircraft having a body and a normally autorotative sustaining rotor including a rotatable hub and a non-rotatable spindle therefor, a supporting structure for mounting the rotor above the body, a transversely extending fulcrum pivoting said spindle upon said structure for longitudinal tilting of the rotor, a rotatable control member extending upwardly from the body, and a second member fixed as against rotation and having threaded connection with said first member and coupled to said spindle for effecting tilting of the axis of the rotor when said first mentioned control member is rotated, said rotatable control member having mounting means providing for limited axial movement thereof.

7. In an aircraft having a body and a normally autorotative sustaining rotor including a rotatable hub and a non-rotatable spindle therefor, a supporting structure for mounting the rotor above the body, a transversely extending fulcrum pivoting said spindle upon said structure for longitudinal tilting of the rotor, a rotatable control member extending upwardly from the body, a second member fixed as against rotation and having threaded connection with said first member and coupled to said spindle for effecting tilting of the axis of the rotor when said first mentioned control member is rotated, said rotatable control member having mounting means providing for limited axial movement thereof, and means yieldingly restraining said movement.

8. In an aircraft with means of forward propulsion and a body having means for receiving disposable loads over an area offset longitudinally from the normal location of the center of gravity of the craft whereby the actual center of gravity travels through a certain fore and aft range according to the loading conditions, a rotary wing system capable of autorotational actuation by the relative air-flow in flight and having pivotally-mounted wings whereby the thrust line of the system moves forwardly with increase in flight speed, the wing mounting means including a rotor head or axis member and means to support the same above the body of the craft, fixed wing surfaces extending laterally of the craft in position to produce during forward flight operation a useful lift passing rearwardly of the normal range of movement of the center of gravity of the craft, the said mounting means locating the rotary wing system with its axis line normally extending approximately upright with respect to the longitudinal axis of the craft and in a position so related to the rearmost limit of the normal range of movement of the center of gravity of the craft that in forward flight, even when the rotor thrust moves forward of the craft's center of gravity, the resultant of the rotor thrust and the fixed wing lift lies slightly behind said limit, and means for adjustably shifting the axis of said system in a direction fore and aft of the craft through a range extending forwardly from the said normal location to a location where the axis line lies close to the forward limit of the normal range of travel of the center of gravity of the craft.

9. In an aircraft, a body having an occupants' cabin therein, a sustaining rotor spaced thereabove, said body having relatively heavy bracing structure adjacent the rear of the cabin and relatively light structure adjacent the front of the cabin whereby impedance of forward vision therefrom is minimized, and a mount for said rotor extending upwardly from said body and having its main strength structure secured to said heavy body members and extending thence from adjacent the rear of the cabin forwardly and upwardly to the point of support of the center of said rotor.

10. In an aircraft, a body having an occupants' cabin therein, a sustaining rotor spaced thereabove, said body having relatively heavy bracing structure adjacent the rear of the cabin and relatively light structure adjacent the front of the cabin whereby impedance of forward vision therefrom is minimized, and a mount for said rotor extending upwardly from said body and having its main strength structure secured to said heavy body members and extending thence from adjacent the rear of the cabin forwardly and upwardly to the point of support of the center of said rotor, said rotor mounting being streamlined, with the streamlining positioned chiefly to the rear of and above the center of gravity of the craft, whereby both lateral and directional stability are enhanced.

11. In an aircraft, a body having an occupants' cabin therein, a sustaining rotor spaced thereabove, said body having relatively heavy bracing structure adjacent the rear of the cabin and relatively light structure adjacent the front of the cabin whereby impedance of forward vision therefrom is minimized, a mount for said rotor extending upwardly from said body and having its main strength structure secured to said heavy body members and extending thence from adjacent the rear of the cabin forwardly and upwardly to the point of support of the center of said rotor, said rotor mount lying in the vertical longitudinal midplane of the craft, and mechanism for shifting the position of the rotor lift line including control means lying substantially in said plane and extending downwardly into said cabin in front of said main strength structure of the mount.

12. In an aircraft, a body having an occupants' cabin therein, a sustaining rotor spaced thereabove, said body having relatively heavy bracing structure adjacent the rear of the cabin and relatively light structure adjacent the front of the cabin whereby impedance of forward vision therefrom is minimized, a mount for said rotor extending upwardly from said body and having its main strength structure secured to said heavy body members and extending thence from adjacent the rear of the cabin forwardly and upwardly to the point of support of the center of said rotor, said rotor mount being of inverted V-shape and lying in the vertical longitudinal midplane of the craft, and mechanism for shifting the position of the rotor lift line including control means lying substantially in said plane and extending downwardly into said cabin in front of said main strength structure of the mount.

13. In an aircraft, a body having an occupants' cabin therein, a sustaining rotor spaced thereabove, said body having relatively heavy bracing structure adjacent the rear of the cabin and relatively light structure adjacent the front of the cabin whereby impedance of forward vision therefrom is minimized, a mount for said rotor extending upwardly from said body and having its main strength structure secured to said heavy body members and extending thence from adjacent the rear of the cabin forwardly and upwardly to the point of support of the center of said rotor, and a rotor driving connection extending upwardly and rearwardly from the body to the apex of the rotor mount and there coupled to the rotor for driving the same.

14. In an aircraft, a body, a sustaining rotor thereabove, a rotor pylon extending upwardly from the body and serving to mount said rotor, a non-rotative member on which the rotor axis is mounted to rotate, said member being located at the top of and pivotally mounted on said pylon for tilting of the rotor axis, fluid pressure motor means fixedly mounted adjacent the top of said pylon and including a substantially horizontally movable element coupled to said non-rotative member by means of a joint which has vertically sliding connection with said member and pivotal connection on a horizontal axis with said element, and fluid pressure control means extending from the body up said pylon and connected to said motor means for actuating said horizontally movable element whereby to tilt the rotor.

15. In an aircraft, a body, a sustaining rotor thereabove, a rotor pylon extending upwardly from the body and serving to mount said rotor, a non-rotative member on which the rotor axis is mounted to rotate, said member being located at the top of and pivotally mounted on said pylon for tilting of the rotor axis, fluid pressure motor means fixedly mounted adjacent the top of said pylon and including a substantially horizontally movable element coupled to said non-rotative member by means of a joint which has vertically sliding connection with said member and pivotal connection on a horizontal axis with said element, fluid pressure control means extending from the body up said pylon and connected to said motor means for actuating said horizontally movable element whereby to tilt the rotor, together with a rotor brake device mounted on said non-rotative member and reacting against the rotatable axis and including a fluid pressure actuating device therefor fixed on said member and having flexible jointed connection to the braking element, and a common source of fluid supply for the rotor tilting and rotor braking mechanisms.

16. In an aircraft, a body, a sustaining rotor thereabove, a rotor pylon extending upwardly from the body and serving to mount said rotor, a non-rotative member on which the rotor axis is mounted to rotate, said member being located at the top of and pivotally mounted on said pylon for tilting of the rotor axis, cylinder and piston elements one of which is immovably mounted adjacent the top of said pylon and the other of which is reciprocable by said fixed element, a connection between the movable element and said axis mounting member having joint means accommodating variation in angularity therebetween, and a controllable fluid pressure system extending from the body up to the upper end of said pylon and having operative connection to said fixed element for actuating said movable element by variations in fluid flow or pressure, whereby to variably tilt the rotor.

17. In an aircraft having a normally autorotatable sustaining wing system or rotor, a rotor mounting and adjusting apparatus comprising a fixed mounting structure, a movable rotor hub supporting member, a pivot device mounting said member on said structure, controllable mechanism connected with said member and movable to various positions for adjustably tilting the latter to generally corresponding positions about said pivot device whereby to set variable limits upon the tilting movement of said member and thus of the rotor, and means providing limited freedom for movement of said member and thus of the rotor in at least one direction relative to the limiting point variably determined by said mechanism, comprising a lost motion connection and a cushioning device arranged to act in sequence.

AGNEW E. LARSEN.